(12) United States Patent
Mertz et al.

(10) Patent No.: US 9,906,309 B2
(45) Date of Patent: Feb. 27, 2018

(54) SYSTEM AND METHOD FOR DETERMINING NONLINEAR MITIGATION PERTURBATIVE DISTORTION COEFFICIENTS USING A RECEIVED OPTICAL SIGNAL

(71) Applicant: Infinera Corp., Annapolis Junction, MD (US)

(72) Inventors: Pierre Hervé Mertz, Baltimore, MD (US); Abdullah Karar, Kingston (CA); Ahmed Awadalla, Gatineau (CA)

(73) Assignee: Infinera Corporation, Sunnyvale, CA (US)

(*) Notice: Subject to any disclaimer, the term of this patent is extended or adjusted under 35 U.S.C. 154(b) by 0 days.

(21) Appl. No.: 14/675,187

(22) Filed: Mar. 31, 2015

(65) Prior Publication Data

US 2016/0294480 A1    Oct. 6, 2016

(51) Int. Cl.
*H04B 10/07*    (2013.01)
*H04B 10/61*    (2013.01)

(52) U.S. Cl.
CPC ................... *H04B 10/6163* (2013.01)

(58) Field of Classification Search
CPC ................................. H04B 10/6161
USPC ............................................ 398/208
See application file for complete search history.

(56) References Cited

U.S. PATENT DOCUMENTS

| | | | |
|---|---|---|---|
| 7,167,513 B2* | 1/2007 | Tsui | H04L 25/03159 333/18 |
| 2006/0056554 A1* | 3/2006 | Lin | H04B 1/30 375/350 |
| 2009/0238579 A1* | 9/2009 | Rahn | H04B 10/697 398/152 |
| 2009/0324224 A1* | 12/2009 | Xie | H04B 10/60 398/65 |
| 2012/0082453 A1* | 4/2012 | Wu | H04J 14/026 398/48 |
| 2012/0128377 A1* | 5/2012 | Hatae | H04B 10/616 398/208 |
| 2014/0029651 A1* | 1/2014 | Zhong | H04L 25/03343 375/219 |

(Continued)

OTHER PUBLICATIONS

Oyama, "Robust and Efficient Receiver-side Compensation Method for Intra-channel Nonlinear Effects", Optical Fiber Communication Conference Optical Society of America, Mar. 9, 2014.*

(Continued)

*Primary Examiner* — Juan A Torres
(74) *Attorney, Agent, or Firm* — David L. Soltz

(57) ABSTRACT

A processor circuit is provided in a coherent optical receiver module. The processor receives a series of electrical signals over a time period, representative of a series of optical signals received at instants of time within the time period. Each of the electrical signals is indicative of a respective one of a plurality of points on an IQ plane, each of the points being spaced from one of a plurality of predetermined points in the IQ plane by a corresponding one of a plurality of distortion values. In addition, the processor circuit calculates one or more perturbative coefficients based on one or more of the distortion values and determines data from the series of electrical signals based on the perturbative coefficient.

17 Claims, 6 Drawing Sheets

(56) References Cited

U.S. PATENT DOCUMENTS

2015/0071630 A1* 3/2015 Oyama .............. H04B 10/6163
          398/25
2015/0071656 A1* 3/2015 Oyama .................. H04B 10/58
          398/194
2015/0372765 A1* 12/2015 Yasuda ................ H04B 10/613
          398/29

OTHER PUBLICATIONS

Liang, "Digital compensation of cross-phase modulation distortions using perturbation technique for dispersion-managed fiber-optic systems," Opt. Express, vol. 22, No. 17, pp. 20634-20645, 2014.*
Tao et al., Multiplier-Free Intrachannel Nonlinearity Compensating Algorithm Operating at Symbol Rate, Journal of Lightwave Technology, Sep. 1, 2011, vol. 29, No. 17, pp. 2570-2576.

* cited by examiner

SYSTEM AND METHOD FOR DETERMINING NONLINEAR MITIGATION PERTURBATIVE DISTORTION COEFFICIENTS USING A RECEIVED OPTICAL SIGNAL

FIELD OF THE DISCLOSURE

The disclosure generally relates to methods and apparatuses in fiber optic communications for mitigation of optical nonlinear effects using perturbative pre- or post-distortion. More particularly, the disclosure relates to the use of one or more coherent optical receiver in calculating perturbation in a received optical signal induced by a fiber optic link such that optical nonlinear mitigation techniques can be used to simulate a normal course of the received optical signal by determining perturbative distortion coefficients from the received optical signal, without knowledge of parameters of the fiber optic link.

BACKGROUND

In fiber optic communications, nonlinearity is a behavior of an optical signal between a transmitter and a receiver in which the optical signal received at the receiver deviates from its normal course and does not vary in direct proportion to the optical signal transmitted at the transmitter. In the art, this is known as perturbation. Examples of nonlinearities include intrachannel nonlinearities, stimulated Brillouin scattering (SBS), stimulated Raman scattering (SRS), four wave mixing (FWM), self-phase modulation (SPM), cross-phase modulation (XPM), and intermodulation. Nonlinear mitigation techniques are used to simulate the normal course of the optical signal and are key to correcting for perturbation and thereby improving capacity and performance in future optical communications.

Back propagation is a technique that may be used to mitigate nonlinear effects in fiber optic links in fiber optic communications. Back propagation simulates error backward down the fiber optic link to address the non-linear effects within the received optical signal. However, back propagation is very computationally intensive.

Optical nonlinear mitigation using perturbative pre- or post-distortion may be used to increase the reach of optical signals in fiber optic communications. The perturbation induced by the fiber optic link is typically calculated using non-linear perturbation distortion coefficients (Cm,n) and the known or recovered transmitted data. The non-linear perturbation coefficients are typically calculated using known fiber optic link parameters, such as pulse width, inverse of symbol rate, the transmission distance, dispersion map, fiber type, amplifier spacing, and fiber nonlinear parameters.

Optical nonlinear mitigation techniques using perturbative pre- or post-distortion algorithms have been shown to be as effective in mitigating optical nonlinear effects in a fiber link as digital back propagation. Given the non-linear perturbation distortion coefficients (Cm,n), the perturbative pre-distortion algorithm is computationally simpler than back propagation.

However, determining and/or measuring fiber optic link parameters used in the current systems to calculate the non-linear perturbation distortion requires human intervention which may be time consuming and expensive. Additionally, the results of the determinations and measurements may be inaccurate. Further, any change in the fiber optic link parameters requires additional determinations and measurements with the current systems. Therefore, methods and systems are needed to determine non-linear perturbation distortion coefficients automatically at the optical receiver, and ideally without knowledge and/or use of the fiber link parameters.

SUMMARY

Methods and systems are disclosed. The problem of optical nonlinear mitigation is addressed through determination of non-linear perturbation distortion coefficients Cm,n from the received optical data stream without knowledge of the fiber link parameters.

In one embodiment, the non-linear perturbation coefficient Cm,n used in optical non-linear mitigation algorithms executed at a coherent optical receiver can be determined by analyzing one or more representation of the received optical signal, such as an optical constellation diagram of one or more received optical data signals used in quadrature amplitude modulation and having particular combinations of amplitude and phase of the optical signal that are used to encode data. The optical constellation diagram can be of various configurations including forms known in the art as QPSK, 8-QAM, 16-QAM, 32-QAM, 64-QAM, and the like.

In one embodiment, the coherent optical receiver can automatically adjust the non-linear perturbation distortion coefficients Cm,n for changes in the fiber optic link periodically and/or randomly without operator intervention or updated information as to the fiber link parameters.

In one embodiment, a method in accordance with the present disclosure may comprise, receiving, with a processor circuit in a coherent optical receiver module, a series of electrical signals over a time period, representative of a series of optical signals received at instants of time within the time period, each of the electrical signals being indicative of a respective one of a plurality of points on an IQ plane, each of the points being spaced from one of a plurality of predetermined points in the IQ plane by a corresponding one of a plurality of distortion values; calculating, with the processor circuit, one or more perturbative coefficients based on one or more of the distortion values; and determining, with the processor circuit, data from the series of electrical signals based on the perturbative coefficient.

In one embodiment, the method may further comprise determining nonlinear offsets based on the perturbative coefficient and determining data from the series of electrical signals based on the nonlinear offsets.

In one embodiment, a coherent optical receiver module comprising one or more processor circuit may be configured to receive a series of electrical signals over a time period, representative of a series of optical signals received at instants of time within the time period, each of the electrical signals being indicative of a respective one of a plurality of points on an IQ plane, each of the points being spaced from one of a plurality of predetermined points in the IQ plane by a corresponding one of a plurality of distortion values; calculate one or more perturbative coefficients based on one or more of the distortion values; and determine data from the series of electrical signals based on the perturbative coefficient.

In one embodiment, Forward Error Correction may be used before or after calculation of the one or more perturbative coefficients. In one embodiment, Forward Error Correction may be used before calculation of the one or more perturbative coefficients, such that training symbols are not required and live data may be used.

In one embodiment, an exemplary coherent optical receiver module may comprise an input port configured to receive a series of optical signals carrying data from a transmitter module via a fiber optic link having one or more optical fiber; an output port; and one or more optical receiver. The optical receiver may comprise: one or more photodiodes configured to receive the series of optical signals via the input port and translate the series of optical signals to a series of electrical signals representative of the series of optical signals carrying the data, and one or more processor circuit. The processor circuit may be configured to: receive the series of electrical signals over a time period, representative of the series of optical signals received at instants of time within the time period, each of the electrical signals being indicative of a respective one of a plurality of points on an IQ plane, each of the points being spaced from one of a plurality of predetermined points in the IQ plane by a corresponding one of a plurality of distortion values; calculate one or more perturbative coefficients based on one or more of the distortion values; and transmit, via the output port, one or more information signals indicative of the one or more perturbative coefficient to the transmitter module. The transmitter module may calculate one or more nonlinear offset values and modify the series of optical signals to preemptively mitigate the distortion before transmission of the optical signals.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
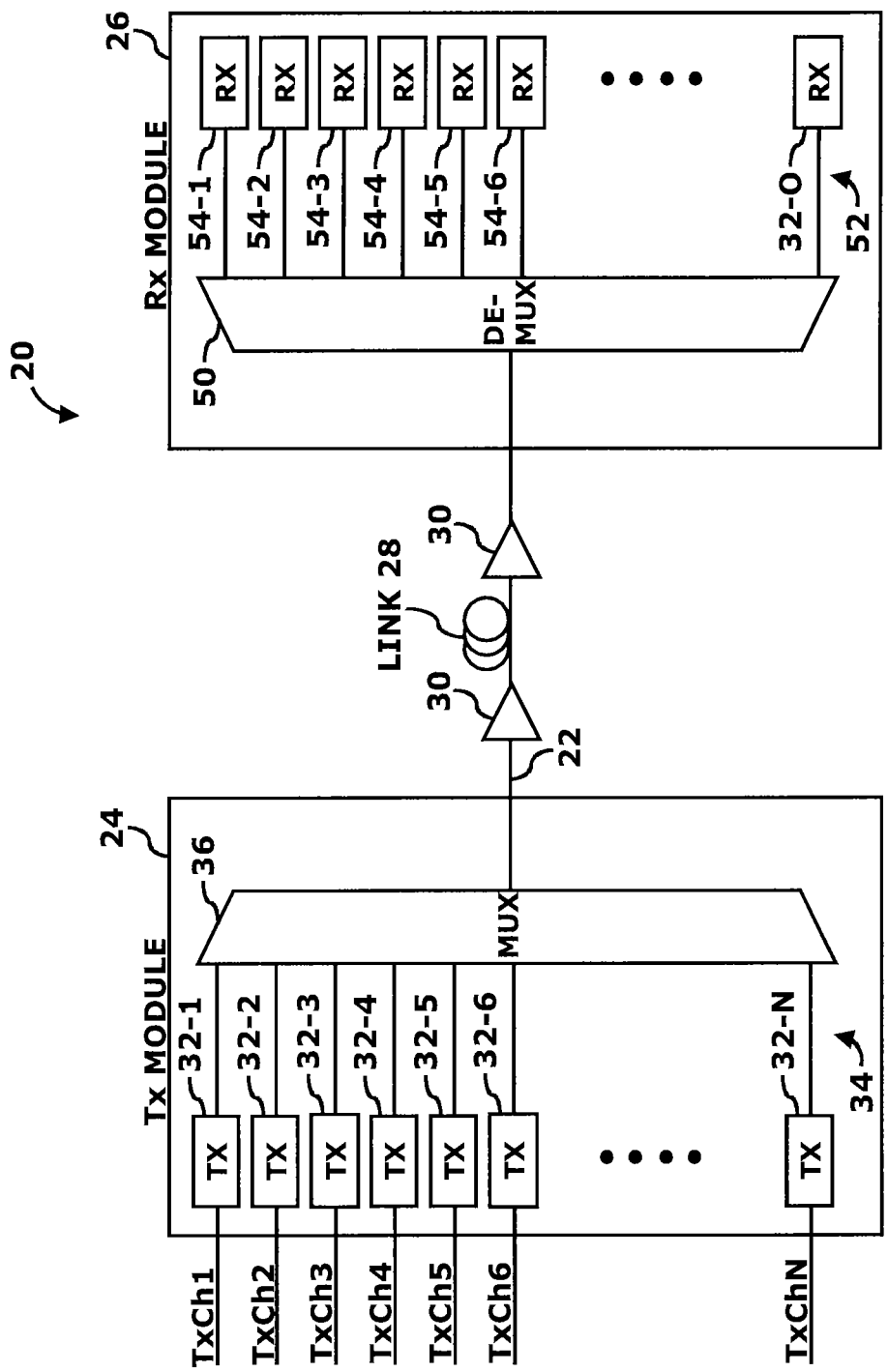
FIG. 1 is a block diagram of an exemplary coherent optical transport system in accordance with the present disclosure.

The following detailed description refers to the accompanying drawings. The same reference numbers in different drawings may identify the same or similar elements.

The mechanisms proposed in this disclosure circumvent the problems described above. Conventionally, nonlinear distortion mitigation methods are computationally intensive and/or require determination and measurement of fiber optic link parameters. In accordance with the present disclosure, systems and methods are disclosed for analyzing one or more optical signals passed through a fiber optic link and received by a coherent optical receiver in order to correct for the optical nonlinear effects of the fiber optic link without dependence on knowledge or use of fiber optic link parameters. In one aspect of the disclosure, electrical signals indicative of points on an IQ plane, each of the points being spaced from one of a plurality of predetermined points in the IQ plane by a corresponding one of a plurality of distortion values, are analyzed to calculate non-linear perturbation distortion coefficients $C_{m,n}$. The coefficients $C_{m,n}$ may be used in one or more optical non-linear mitigation algorithm to calculate distortion values. The distortion values may be used to correct for optical nonlinear effects induced by the fiber optical link.

An exemplary embodiment may include systems and methods which may comprise receiving, with a processor circuit in a coherent optical receiver module, a series of electrical signals over a time period, representative of a series of optical signals received at instants of time within the time period, each of the electrical signals being indicative of a respective one of a plurality of points on an IQ plane, each of the points being spaced from one of a plurality of predetermined points in the IQ plane by a corresponding one of a plurality of distortion values; and calculating one or more perturbative coefficients based on one or more of the distortion values.

In one embodiment, the receiver processor circuit may determine data from the series of electrical signals based on the perturbative coefficients.

In one embodiment, the receiver processor circuit may determine nonlinear offsets based on the perturbative coefficient, and may determine data from the series of electrical signals based on the nonlinear offsets.

In one embodiment, the coherent optical receiver module may transmit one or more information signals indicative of the one or more perturbative coefficient to a transmitter module. The transmitter module may determine nonlinear offsets based on the perturbative coefficient and may apply the nonlinear offsets in order to modify the series of optical signals before transmission of the optical signals to the coherent optical receiver module in order to preemptively mitigate the distortion.

DEFINITIONS

If used throughout the description and the drawings, the following short terms have the following meanings unless otherwise stated:

DP-QPSK stands for dual-polarized quadrature phase shift keying. DP-QPSK is an optical signal modulation format that has been implemented in coherent optical systems.

DSP stands for digital signal processor.

PIC stands for photonic integrated circuit.

Pol Muxed DQPSK stands for polarization multiplexed differential quadrature phase-shift keying. Pol Muxed DQPSK is an optical signal modulation format.

PSK stands for phase-shift keying. PSK is an optical signal modulation scheme that conveys data by changing, or modulating, the phase of a reference signal (the carrier wave).

QAM stands for quadrature amplitude modulation. QAM is an optical signal modulation scheme.

Rx stands for Receiver, which typically refers to optical channel receivers, but can also refer to circuit receivers.

Tx stands for Transmitter, which typically refers to optical channel transmitters, but can also refer to circuit transmitters.

WDM stands for wavelength division multiplexing. In WDM, multiple optical signals, each having a different wavelength, are combined onto a single optical fiber using an optical multiplexer circuit ("multiplexer").

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

The use of the term "at least one" or "one or more" will be understood to include one as well as any quantity more than one, including but not limited to, 1, 2, 3, 4, 5, 10, 15, 20, 30, 40, 50, 100, etc. The term "at least one" or "one or more" may extend up to 100 or 1000 or more depending on the term to which it is attached. In addition, the quantities of 100/1000 are not to be considered limiting, as lower or higher limits may also produce satisfactory results.

In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

In accordance with the present disclosure, circuitry could be analog and/or digital, components, or one or more suitably programmed microprocessors and associated hardware and software, or hardwired logic. Also, certain portions of the implementations have been described as "components" or "circuitry" that performs one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, current nonlinear mitigation methods are computationally intensive and/or require determination and measurement of system parameters. The present disclosure addresses these deficiencies with systems and methods for analyzing one or more electrical signal representative of one or more received optical signals in a coherent optical receiver in order to affect the performance of the optical signal system without dependence on knowledge of system parameters.

Referring now to the drawings, FIG. 1 is a block diagram of an example optical network 20 in which systems and/or methods, described herein, may be implemented.

While FIG. 1 shows a particular configuration of components in network 20, in practice, network 20 may include additional components, different components, or differently arranged components than what are shown in FIG. 1. Also, in some instances, one of the components illustrated in FIG. 1 may perform a function described herein as being performed by another one of the components illustrated in FIG. 1.

The network 20 may be part of a wavelength division multiplexed (WDM) optical communication system (referred to as a "WDM system"). WDM systems are systems in which multiple optical signals 22, each having a different wavelength, are combined onto a single optical fiber. The components in an optical communication system may support communications over a number of wavelength channels.

As illustrated in FIG. 1, network 20 may include optical transmitter (Tx) module 24 (e.g., a Tx PIC) and/or optical receiver (Rx) module 26 (e.g., an Rx PIC). In some implementations, transmitter module 24 may be optically connected to receiver module 26 via link 28, and/or optical amplifiers 30. Link 28 may include one or more optical amplifiers 30 that amplify the optical signal 22 as the optical signal 22 is transmitted over link 28 from the transmitter module 24 to the receiver module 26.

In use, the transmitter module 24 may modulate a phase of the optical signal 22 in order to convey data (via the optical signal 22) to the receiver module 26 where the optical signal 22 may be demodulated such that data, included in the optical signal 22, may be recovered. A particular modulation format (e.g., phase-shift keying (PSK), quadrature amplitude modulation (QAM), demultiplex quadrature phase shift keying (QPSK), Pol Muxed DQPSK, etc.) may be used to modulate the input signal. Different modulation formats correspond to different distances that the input signal may be transmitted. Further, different modulation formats may result in different bit error rates (BERs) associated with the optical signal 22.

In modulation formats, the polarization of the optical signal 22 may be used to modulate the optical signal 22. Polarization is the direction of the electric field in the lightwave. If the electric field of the lightwave is in the Y Axis, the light is said to be vertically polarized. If the electric field of the lightwave is in the X axis, the light is said to be horizontally polarized. Additionally, the amplitude and the phase of the optical signal may be modulated. There may be an in-phase component (I) of the optical signal proportional to the cosine of the phase shift and a quadrature component (Q) proportional to the sine of the phase shift of the optical signal.

Transmitter module 24 may include a number of optical transmitters 32-1 through 32-N (where N is greater than or equal to 1), waveguides 34, and/or optical multiplexer 36. Each optical transmitter 32 may receive a data channel (TxCh1 through TxChN), modulate the data channel with an optical signal, and transmit the data channel as an optical signal. In one implementation, transmitter module 24 may include 5, 10, 20, 50, 100, or some other number of optical transmitters 32. Each optical transmitter 32 may be tuned to use an optical carrier of a designated wavelength. It may be desirable that the grid of wavelengths emitted by optical transmitters 32 conform to a known standard, such as a standard published by the Telecommunication Standardization Sector (ITU-T).

Figure 2:
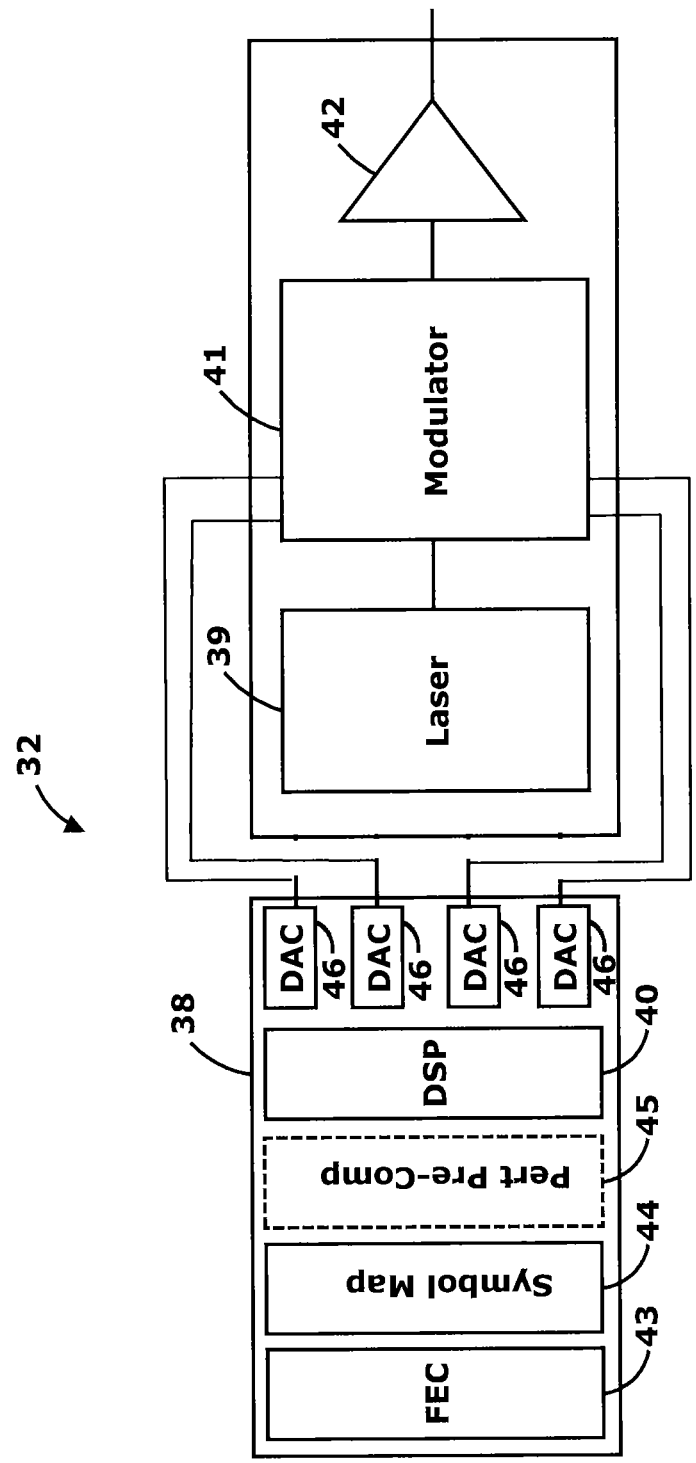
FIG. 2 is a block diagram of an exemplary coherent optical transmitter in accordance with the present disclosure.

It will be understood that the optical transmitters 32 may be implemented in a variety of ways. For example, FIG. 2 is one exemplary implementation of the optical transmitter 32. The optical transmitter 32 may comprise one or more transmitter processor circuit 38, one or more laser 39, one or more modulator 41, one or more semiconductor optical amplifier (SOA) 42, and/or other components (not shown).

The one or more transmitter processor circuit 38 may have one or more transmitter digital signal processor (DSP) 40, Transmitter Forward Error Correction (FEC) circuitry 43, Symbol Map circuitry 44, Transmitter Perturbative Pre-Compensation circuitry 45, and digital-to-analogue converters (DAC) 46. The transmitter processor circuit 38 may be located in any one or more components of the optical transmitter 32, or separate from the components, and/or in any location(s) among the components. The transmitter processor circuit 38 may be in the form of one or more Application Specific Integrated Circuit (ASIC), which may contain one or more modules and/or custom modules.

Processed electrical outputs from the transmitter processor circuit 38 may be supplied to the modulator 41. Processed electrical outputs from the transmitter processor circuit 38 may be supplied other circuitry in the transmitter processor circuit 38, for example, clock and data modification circuitry. The laser 39, modulator 41, and/or SOA 42 may be coupled with a tuning element (e.g., a heater) (not shown) that can be used to tune the wavelength of an optical signal channel output by the laser 39, modulator 41, or SOA 42. In some implementations, a single laser 39 may be shared by multiple optical transmitters 32.

Other possible components in the optical transmitter 32 may include filters, circuit blocks, memory, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein.

Returning now to FIG. 1, waveguides 34 may include an optical link to transmit modulated outputs (referred to as "signal channels") of optical transmitters 32. In some implementations, each optical transmitter 32 may connect to one waveguide 34 or to multiple waveguides 34 to transmit signal channels of optical transmitters 32 to optical multiplexer 36. In some implementations, waveguides 34 may be made from a birefringent material and/or some other material.

Optical multiplexer 36 may include an arrayed waveguide grating (AWG) or some other multiplexing device. In some implementations, optical multiplexer 36 may combine multiple signal channels, associated with optical transmitters 32, into a wave division multiplexed (WDM) signal, such as optical signal 22. Optical signals 22 may be quadrature phase shift keying (QPSK) optical signals, for example.

As further shown in FIG. 1, receiver module 26 may include optical demultiplexer 50, waveguides 52, and/or optical receivers 54-1 through 54-O (where O is greater than or equal to 1). In some implementations, optical demultiplexer 50 may include an AWG or some other device. Optical demultiplexer 50 may supply multiple signal channels based on a received WDM signal (e.g., optical signal 22). The optical receiver module 26 may be used to demultiplex quadrature phase shift keying (QPSK) optical signals 22.

As shown in FIG. 1, optical demultiplexer 50 may supply signal channels to optical receivers 54 via waveguides 52. Waveguides 52 may include optical links to transmit outputs of optical demultiplexer 50 to optical receivers 54. In some implementations, each optical receiver 54 may receive outputs via a single waveguide 52 or via multiple waveguides 52. In some implementations, waveguides 52 may be birefringent (e.g., based on the width of waveguides 52).

Optical receivers 54 may each operate to convert an input optical signal 22 to an electrical signal 60 that represents the transmitted data. In some implementations, optical receivers 54 may each include one or more photodetectors and/or related devices to receive respective input optical signals 22 outputted by optical demultiplexer 50 and a local oscillator 72, convert the signals to a photocurrent, and provide a voltage output to function as the electrical signal 60 representation of the original input optical signal 22. Optical receivers 54 may be implemented in other ways, as is well known in the art. Exemplary optical receiver modules 26 and optical receivers 54 are further described in U.S. patent application Ser. No. 12/052,541, titled "Coherent Optical Receiver".

Figure 3:
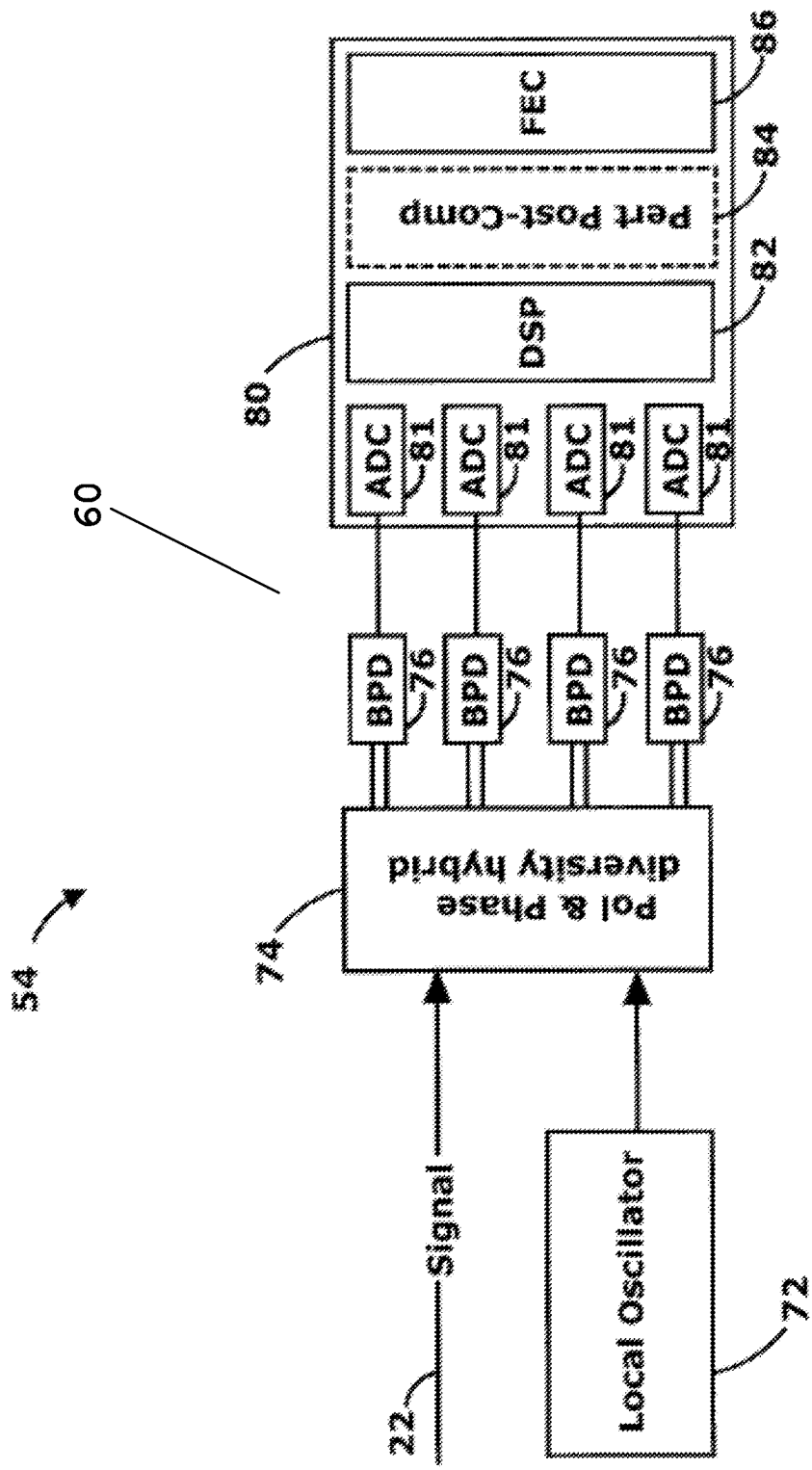
FIG. 3 is a block diagram of an exemplary coherent optical receiver in accordance with the present disclosure.

For example, FIG. 3 illustrates a block diagram of an exemplary optical receiver 54 consistent with the present disclosure. Optical receiver 54 may comprise one or more local oscillator (LO) 72, a polarization and phase diversity hybrid circuit 74 receiving the optical signal 22 and the input from the local oscillator (LO) 72, one or more balanced photo-diodes (BDP) 76 that produce the electrical signals 60 representative of the optical signal 22, and one or more receiver processor circuit 80.

The one or more receiver processor circuit 80, may comprise one or more analogue-to-digital converter (ADC) 81 receiving the electrical signals 60 from the balanced photo-diodes 76, one or more receiver digital signal processor (DSP) 82, Receiver Perturbative Post-Compensation circuitry 84, and Receiver Forward Error Correction (FEC) circuitry 86. The Receiver Forward Error Correction circuitry 86 may apply corrections to the data, as is well known in the art. The one or more receiver processor circuit 80 and/or the one or more receiver DSP 82 may be located on one or more components of the optical receiver 54 or separately from the components, and/or in any location(s) among the components. The receiver processor circuit 80 may be in the form of an Application Specific Integrated Circuit (ASIC), which may contain one or more modules and/or custom modules.

The one or more receiver DSP 82 receives and processes the electrical signals 60 with multi-input-multiple-output (MIMO) circuitry, as described, for example, in U.S. patent application Ser. No. 12/052,541, titled "Coherent Optical Receiver", the entire content of which is incorporated herein by reference in its entirety. Processed electrical outputs from receiver DSP 82 may be supplied other circuitry in the receiver processor circuit 80, such as the Receiver Perturbative Post-Compensation circuitry 84 and the Receiver Forward Error Correction (FEC) circuitry 86.

Various components of the optical receiver module 26 may be provided or integrated, in one example, on a common substrate. Further integration is achieved by incorporating various optical demultiplexer designs that are relatively compact and conserve space on the surface of the substrate.

In use, the optical signal 22 may be subjected to optical non-linear effects between the transmitter module 24 and the receiver DSP 82 of the receiver processor circuit 80 such that the optical signal 22 received does not accurately convey the carried data in the form that the optical signal 22 was transmitted. The effects of optical nonlinear effects can be mitigated by applying perturbative distortion algorithms to determine the nonlinear offset (which may be referred to as a distortion offset and/or Δu). Optical nonlinear mitigation using perturbative pre- or post-distortion may be used to compensate for the optical non-linear effects and increase the reach of optical signals in fiber optic communications.

The amount of perturbation may be calculated using coefficients (Cm,n) in the algorithms and the known or recovered transmitted data. The coefficients Cm,n may be calculated, in accordance with the present disclosure, by use of analysis of one or more incoming optical signal 22 at the receiver module 26. In one aspect of the present disclosure, analysis of the one or more incoming optical signal 22 utilizes analysis of points on an IQ plane, such as in a constellation diagram 100, based on electrical signals 60 indicative of the optical signals 22.

Figure 4:
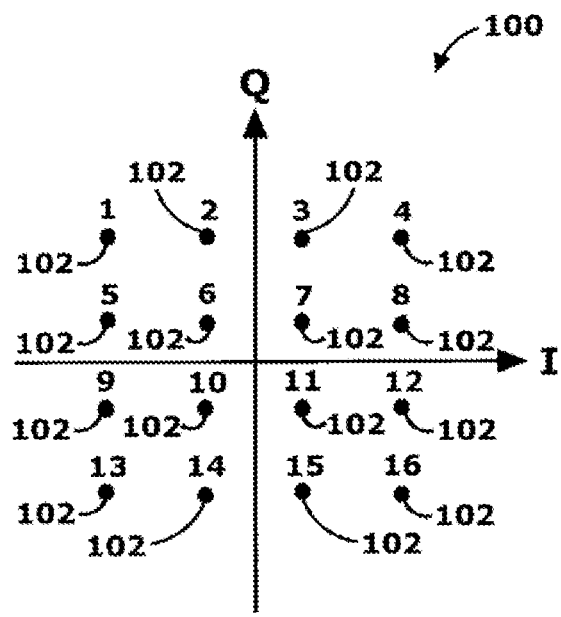
FIG. 4 is an exemplary undistorted constellation diagram used in quadrature amplitude modulation and having 16 particular different combinations of amplitude and phase of the optical signal that are used to encode four-bits of data.

Turning now to FIG. 4, the receiver DSP 82 of the optical receiver 54 may create the constellation diagram 100 based on the received electrical signals 60 representative of the optical signal 22. The constellation diagram 100, also referred to as a constellation map, an optical constellation, and/or simply a constellation, is a representation of the optical signal 22, where the optical signal 22 is modulated by a digital modulation scheme (such as quadrature amplitude modulation, phase-shift keying, etc.). The constellation diagram 100 displays the representation of the optical signal 22 as a two-dimensional scatter diagram in the complex IQ plane at symbol sampling instants. The constellation diagram 100 may be graphed with "Q" as the y axis and "I" as the x axis. In a more abstract sense, the constellation 100 represents the possible symbols that may be selected by a given modulation scheme as points in the complex plane. The symbols are representative of data bits transmitted in the optical signal 22 at any one time.

Data is transmitted by a sequence of the symbols over time, where each symbol is represented as a point 102 at a location on the constellation 100. When the symbols are transmitted, the symbols conform to points 102 on the expected the IQ plane of the constellation 100. Upon reception of the electrical signals 60 representative of the optical signal 22, the receiver DSP 82 examines the received symbol, which may have been corrupted and therefore may not conform to the expected predetermined point 102 on IQ plane of the constellation 100. The receiver module 26 may select, as an estimate of the symbol that was actually transmitted, the point 102 on the constellation diagram 100 which is closest (in a Euclidean distance sense) to that of the received symbol point 102.

For example, FIG. 4 depicts an exemplary 16-QAM constellation 100 exhibiting the correct rotation and no in-phase or quadrature-phase inversion errors. The 16 points 102 (numbered 102-1 through 102-16) of the overall constellation diagram 100 have been arbitrarily indicated as shown. It will be understood, however, that at any instant in time, a symbol may be represented on the constellation as one of the points 102-1-102-16.

Various embodiments may utilize many different modulation techniques for the optical signal 22, which determines the ideal pattern of predetermined points in the IQ plane of the constellation 100. Nonexclusive examples of modulation schemes for the optical signals 22 include rectangular QAM, regular or irregular star-QAM, circular QAM, phase shift keying (PSK), amplitude shift keying (ASK), and orthogonal frequency-division multiplexing (OFDM). The different modulation techniques used may comprise smaller constellation diagrams 100 (e.g., 8-QAM) or larger constellation diagrams 100 (e.g., 256-QAM) than the exemplary sized constellation diagrams 100 discussed herein. Additionally, the different modulation techniques used may utilize differential encoding or non-differential encoding techniques. Other modifications will be known to those skilled in the art and informed by the teachings of the present invention. The type of system and number of light transmissions dictates how many points 102 are seen in the constellation 100 representing a particular instant, for example, as 4 points, 8 points, or 16 points.

For the optical receiver module 26 to provide valid data through the correct symbol-to-binary demapping, the constellation 100 processed by the optical receiver 54 must exhibit a correct rotation and have no in-phase or quadrature-phase inversion errors associated with it.

If the optical network 20 were perfect, without nonlinearity, the received points 102 would be perfectly centered on a grid, exactly as transmitted, at predetermined points. With nonlinearities, however, the received points 102 don't lie on grid exactly—the offset from the grid, that is, the space from the predetermined points, is represented as a distortion value "Δu" (also known as an offset Δu) at the receiver module 26. The offset Δu represents the nonlinear shift, not Amplified Spontaneous Emission (ASE) shift.

The still-encoded sample stream provided by the receiver DSP 82 to subsequent demodulation/processing elements (not shown in the various figures) is corrected to conform to the requirements of the constellation 100 (i.e. the predetermined points in the IQ plane), either immediately after the receiver DSP 82, or at another suitable stage within the processing chain, e.g., at a pre-FEC stage, an FEC stage, or at an OTN deframing stage.

Figure 5:
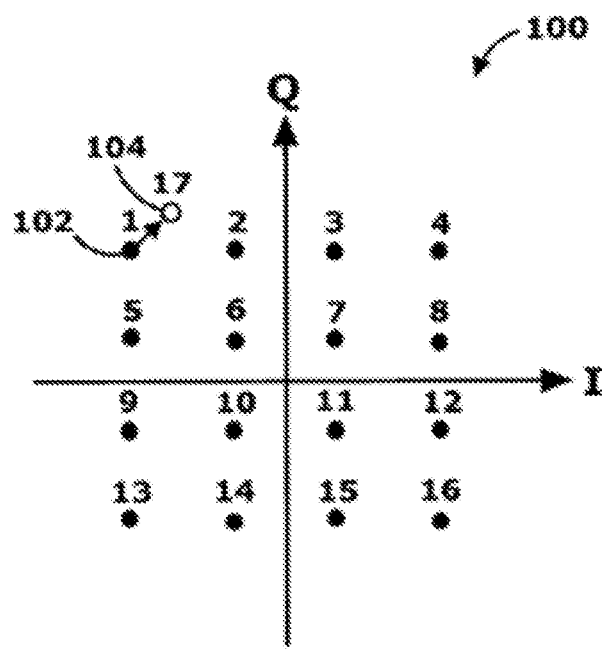
FIG. 5 is an exemplary constellation diagram of an optical signal passed through a fiber optic link and received by a coherent optical receiver in which optical nonlinear effects are present.

Referring now to FIG. 5, an exemplary constellation diagram 100, is shown of the optical signal 22, passed through the fiber optic link 28 and received by the coherent optical receiver 54, in which optical nonlinear effects are present. The constellation 100 depicts a received symbol illustrated as representative point 102-17 in the IQ plane. The shift between where the symbol would be expected, for example, at predetermined point 102-1, and the received point 102-17 occurs due to pattern-dependent nonlinearities. Therefore, point 102-17 would appear to be in different locations in the IQ plane of the constellation diagram 100 depending on the pattern. Vector 104, from the predicted predetermined point 102-1 to the received symbol point 102-17, corresponds to an offset $\Delta u$ (that is, a distortion value) for a point in time.

If the nonlinear offset can be determined, the nonlinear distortion may be mitigated. Calculations to determine nonlinear offset to mitigate the nonlinear distortion may be run in a processor circuit, such as the receiver DSP 82 or the Receiver Perturbative Post-Compensation circuitry 84 of the receiver processor circuit 80, or the transmitter DSP 40 or the Transmitter Perturbative Pre-Compensation circuitry 45 of the transmitter processor circuit 38.

Algorithms to calculate nonlinear offset, which may be averaged, smoothed, or otherwise modified to reduce noise factors, may utilize perturbative coefficients Cm,n. The perturbative coefficients Cm,n used in the calculations of the offsets may be determined either inside the receiver DSP 82 or outside the receiver DSP 82 or elsewhere in the receiver module 26. Computation of the coefficients Cm,n is not on the main data path. In one embodiment, an averaging circuit may be used. A single averager (or one per polarization, or one each for xx, yx, yy, and xy) on the receiver processor circuit 80 may be used.

The following algorithms may be calculated by the receiver processor circuit 80 to determine the coefficients Cm,n using special averaging techniques applied to determinations of the incoming data, utilizing the points 102 and distortion values $\Delta u$ on the IQ plane of constellations 100:

$$C_{m,n}^{px} = \frac{1}{T}\sum_{t=0}^{T-1}\frac{\Delta u_{t,x}}{A_{n,p}A_{m+n,p}^{*}A_{m,x}}$$

where p can be either the x or y polarization, and
where m denotes moving forward in time, and
where n denotes moving backward in time, and
where the range of n and m is typically in the range of +/−10 or +/−20, and
where T is the number of samples averaged, and
where t is $\Delta u$ at a particular point of time, and
where $\Delta u$ in the equation is the difference due to nonlinear interactions of an actual location of the point 102 compared to an expected predetermined location of the point 102 in the IQ plane of the constellation diagram 100, at a point in time, represented by:

$$\Delta u_{t,x} = \text{SoftOut}_{t,x} - \text{Decision}_{t,x}$$

where SoftOut represents the location on the grid of the constellation 100 of the point 102 as received (for example point 102-17), and
where Decision represents the chosen expected point (for example, points 102-1-102-16) on the grid to which the point 102 as received should conform.

In the equations, the symbol sequence is denoted as $A_n$, where "A" is a complex number of the data on the I/Q complex plane below, and n is the position in time relative to the current symbol. "A" may be the data pattern. The Decisions can also be used for "A". In one embodiment, the Decisions can be taken after the FEC circuit 43 applies forward error correction to the data. In one embodiment, "A's" could also be based on SoftOut without Decision.

From the first equation, $\Delta u$ can be calculated for each symbol in time (t), given the "A's" (symbols at other times), and the coefficients Cm,n. The offset $\Delta u$ may be calculated in the receiver processor circuit 80, such as the receiver DSP 82, and/or the transmitter processor circuit 38, such as the transmitter DSP 40. If the $\Delta u$ is calculated in the receiver processor circuit 80, such as in the Receiver Perturbative Post-Compensation circuitry 84, the "A" may be the Soft-Out. If the $\Delta u$ is calculated in the transmitter processor circuit 38, such as the Transmitter Perturbative Pre-Compensation circuitry 45, the "A's" may be the actual symbols.

The receiver processor circuit 80 (for example, firmware of the receiver DSP 82) may build a coefficient Cm,n matrix by sequencing through the (p, m, n) combinations using the following equations under the following circumstances for the different polarizations x, y:

$$C_{m,n}^{xx} = \begin{cases} c_{m,n}^{xx} & \text{if } m = n; m \neq 0; n \neq 0 \\ c_{m,n}^{xx}/2 & \text{if } m \neq n, m \neq 0, n \neq 0 \\ \beta c_{0,n}^{yx} & \text{if } m = 0, n \neq 0 \end{cases}$$

where $\beta$ is a scaling factor, where:

$$\beta = \left(\frac{c_{m,n}^{xx}}{c_{m,n}^{yx}}\right) m \neq 0, n \neq 0, m \neq n$$

And:

$$C_{m,n}^{yx} = \begin{cases} c_{m,n}^{yx} & \text{if } m \neq 0; n \neq 0 \\ c_{0,n}^{yx} & \text{if } m = 0, n \neq 0 \text{ or } m \neq 0, n = 0 \end{cases}$$

The coefficient Cm,n may also be determined using a Least Means Squares algorithm or any mathematical method to iteratively near the actual values of the coefficient Cm,n based on samples over time, to adjust the coefficients Cm,n to minimize the perturbative error.

The coefficient Cm,n values may then be used to calculate, for example, in the receiver processor circuit 80 and/or the transmitter processor circuit 38, the offset $\Delta u$ using known equations for the offset $\Delta u$ (for example, Equation 10 detailed in *Multiplier-Free Intrachannel Nonlinearity Compensating Algorithm Operating at Symbol Rate*, Zhenning Tao, et al., Journal of Lightwave Technology, Vol. 29, No. 17, p. 2572, Sep. 1, 2011.), such as the following:

$$\Delta u_x = \Sigma_{m,n} P_0^{3/2}(A_{n,x}A^*_{m+n,x}A_{m,x} + A_{n,y}A^*_{m+n,y}A_{m,x})C_{m,n}$$

$$\Delta u_y = \Sigma_{m,n} P_0^{3/2}(A_{n,y}A^*_{m+n,y}A_{m,y} + A_{n,x}A^*_{m+n,x}A_{m,y})C_{m,n}$$

where $P_0$ is the pulse peak power at the launch point, and $A^*$ represents the complex conjugate of A.

In one embodiment, the offsets $\Delta u$ may then be applied to the electrical signals 60 by the optical receiver 54 to conform the symbols to the points 102 of the constellation 100 to mitigate the nonlinearities affecting the optical signals 22 and to retrieve the data from the electrical signals 60. In one implementation, the receiver processor circuit 80 applies the offsets $\Delta u$ before the Receiver Forward Error Correction circuitry 86 processes the data and/or applies corrections.

In one embodiment, the data patterns ("A") used in the calculations to determine the perturbative coefficients Cm,n may be taken after the FEC corrections, which may make the calculations for Cm,n more accurate. Taking the data patterns "A" after the FEC corrections means that training symbols are not required, and the method may be used with live data.

Alternatively, or additionally, the receiver module 26 may transmit signals indicative of the perturbative coefficients Cm,n to the transmitter module 24. The Transmitter Perturbative Pre-Compensation circuitry 45 may then calculate the offsets Δu. The transmitter module 24 may then preemptively apply the offsets Δu in an opposite direction of the measured distortion to the optical signals 22 before transmission such that the nonlinear distortions are mitigated. In one implementation, the transmitter processor circuit 38 applies the offsets Δu in, before the Transmitter Forward Error Correction circuitry 43 processes the data.

The coefficients Cm,n and offsets Δu may be calculated in situ with live traffic incoming to the receiver module 26, thus allowing for changing conditions in the network 20. Additionally, calculating the coefficients Cm,n and offsets Δu as described does not require training symbols.

Figure 6:
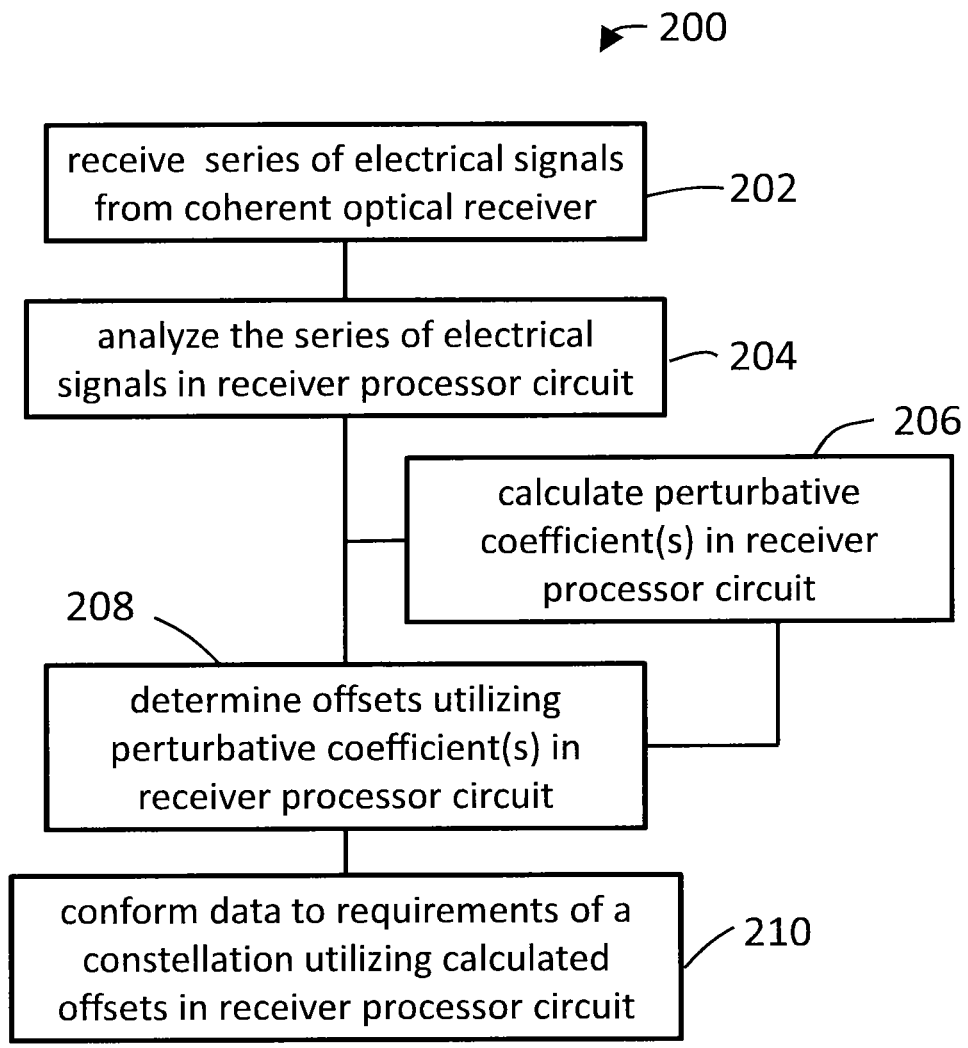
FIG. 6 is a process flow diagram of an exemplary process in accordance with the present disclosure.

FIG. 6 is a process flow diagram of an exemplary process 200 in accordance with the present disclosure. In step 202, the receiver processor circuit 80 of the optical receiver module 26 receives a series of the electrical signals 60 over a time period. The electrical signals 60 are representative of a series of the optical signals 22 received at instants of time within the time period. The optical signals 22 contain data in a form of the constellation 100, such that a particular point 102 in the grid of the constellation 100 is represented for a particular instant in time. The electrical signals have distortion and representative points 102 at locations within the constellation 100. In step 204, the receiver processor circuit 80, analyzes the location of the representative points 102 within the constellation 100 relative to a predetermined pattern of points 102.

In step 206, the receiver processor circuit 80, calculates one or more perturbative coefficient based on the analysis. The perturbative coefficient Cm,n may be calculated outside of the main data path. In step 208, the receiver processor circuit 81, such as the Receiver Perturbative Post-Compensation circuitry 84 and/or the receiver DSP 82, may determine offsets Δu utilizing the perturbative coefficient(s) Cm,n.

In step 210, the receiver processor circuit 80, determines the data from the series of electrical signals 60 using the perturbative coefficient(s) to interpret the distortion in the plurality of points 102 in the constellation 100. In one implementation, the receiver processor circuit 80 applies the offsets Δu before the Receiver Forward Error Correction circuitry 86 processes the data.

Figure 7:
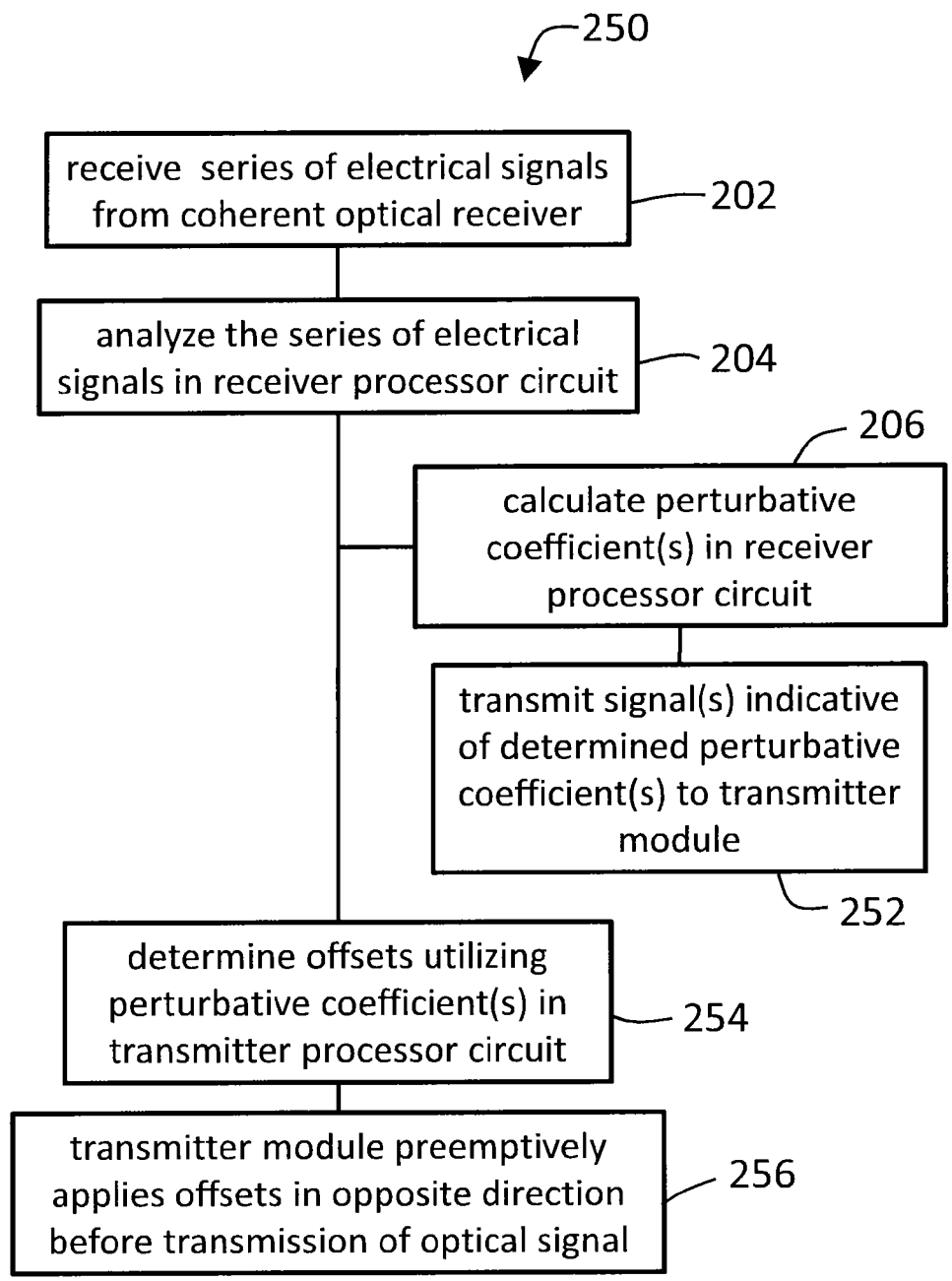
FIG. 7 is a process flow diagram of another exemplary process in accordance with the present disclosure.

FIG. 7 is a process flow diagram of an exemplary process 250 in accordance with the present disclosure. In process 250, steps 202 through 206 are identical to steps 202 through 206 described in relation to FIG. 6. In step 252, however, the receiver module 26 transmits one or more information signals indicative of the coefficients Cm,n to the transmitter module 24. In step 254, the transmitter module 24 receives the information signals and calculates the offset values Δu. In step 256, the transmitter module 24 applies the offset values Δu preemptively before transmission of the optical signal 22 to preemptively mitigate the nonlinear distortion in the optical signal 22, so the optical signal 22 when received at the coherent optical receiver module 26 will conform to requirements of the constellation 100. In one implementation, the transmitter module 24 may apply the offset values Δu after the Transmitter Forward Error Correction circuitry 43 processes the data and/or applies corrections.

CONCLUSION

Conventionally, nonlinear distortion mitigation methods are computationally intensive and/or require determination and measurement of system parameters. In accordance with the present disclosure, systems and methods are disclosed for analyzing the incoming optical signal carrying a data stream in a coherent optical receiver in order to affect the performance of the optical signal network without dependence on knowledge of system parameters.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to other types of networks having nonlinear distortions.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment.

What is claimed is:

1. A method, comprising:
receiving a series of optical signals with a coherent optical receiver module;
generating a series of electrical signals in response to the received optical signals;
receiving, with a processor circuit in the coherent optical receiver module, a series of electrical signals over a time period, representative of the series of optical signals received at instants of time within the time period, each of the electrical signals being indicative of a respective one of a plurality of points on an IQ plane, each of the points corresponding to a respective one of the series of optical signals and being spaced from a respective one of a plurality of predetermined points in the IQ plane by a corresponding one of a plurality of distortion values;
calculating, with the processor circuit, perturbative coefficients, $c_{m,n}^{px}$; and
determining, with the processor circuit, data from at least one of the series of electrical signals based on the perturbative coefficient, wherein the perturbative coefficients, $c_{m,n}^{px}$, satisfies:

$$c_{m,n}^{px} = \frac{1}{T}\sum_{t=0}^{T-1} \frac{\Delta u_{t,x}}{A_{n,p}A_{m+n,p}^* A_{m,x}}$$

where p is a polarization of the optical signals,
where m denotes a moving forward in time,
where n denotes a moving backward in time,
where T is a number of the series of electrical signals averaged, and
where t is $\Delta u_{t,x}$ is at a particular point of time, and
where $\Delta u_{t,x}$ is one of the plurality of distortion values.

2. The method of claim 1, wherein prior to determining the data from the series of electrical signals based on the perturbative coefficient, the method comprises determining, with the processor circuit, nonlinear offsets based on the perturbative coefficient, and wherein determining the data from the series of electrical signals is based on the nonlinear offsets based on the perturbative coefficient.

3. The method of claim 1, wherein determining the data further comprises modifying the data to conform to the predetermined points.

4. The method of claim 1, wherein determining the data occurs before correction of the data with Forward Error Correction.

5. The method of claim 1, wherein determining the data occurs after correction of the data with Forward Error Correction.

6. The method of claim 1, wherein calculating, with the processor circuit, further comprises using least mean squares techniques applied to a determination of the distortion value over the time period.

7. A coherent optical receiver module comprising:
a plurality of photodiodes that receive a series of optical signals and generate a series of electrical signals; and
one or more processor circuits configured to:
receive the series of electrical signals over a time period, representative of a series of optical signals received at instants of time within the time period, each of the electrical signals being indicative of a respective one of a plurality of points on an IQ plane, corresponding to a respective one of the series of optical signals and each of the points being spaced from one of a plurality of predetermined points in the IQ plane by a corresponding one of a plurality of distortion values;
calculate perturbative coefficients, $c_{m,n}^{px}$; and
determine data from at least one of the series of electrical signals based on the perturbative coefficient, wherein the perturbative coefficients, $c_{m,n}^{px}$, satisfy:

$$c_{m,n}^{px} = \frac{1}{T} \sum_{t=0}^{T-1} \frac{\Delta u_{t,x}}{A_{n,p} A_{m+n,p}^* A_{m,x}}$$

where p is a polarization of the optical signals,
where m denotes a moving forward in time,
where n denotes a moving backward in time,
where T is a number of the series of electrical signals averaged, and
where t is $\Delta u_{t,x}$ at a particular point of time, and
where $\Delta u_{t,x}$ is one of the plurality of distortion values.

8. The coherent optical receiver module of claim 7, wherein the one or more processor circuits is configured to determine nonlinear offsets based on the perturbative coefficient prior to determining the data, and wherein determining the data is based on the nonlinear offsets based on the perturbative coefficient.

9. The coherent optical receiver module of claim 7, wherein the one or more processor circuits is further configured to modify the data to conform to the predetermined points.

10. The coherent optical receiver module of claim 7, wherein determining the data occurs before correction of the data with Forward Error Correction.

11. The coherent optical receiver module of claim 7, wherein determining the data occurs after correction of the data with Forward Error Correction.

12. The coherent optical receiver module of claim 7, wherein the one or more processor circuits is configured to use least mean squares techniques applied to determinations of the distortion values over the time period.

13. A coherent optical receiver module, comprising:
an input port configured to receive a series of optical signals carrying data from a transmitter module via a fiber optic link having one or more optical fiber;
an output port; and
one or more optical receiver comprising:
one or more photodiodes configured to receive the series of optical signals via the input port and translate the series of optical signals to a series of electrical signals representative of the series of optical signals carrying the data; and
one or more processor circuits configured to:
receive the series of electrical signals over a time period, representative of the series of optical signals received at instants of time within the time period, each of the electrical signals being indicative of a respective one of a plurality of points on an IQ plane, each of the points corresponding to a respective one of the series of optical signals and being spaced from one of a plurality of predetermined points in the IQ plane by a corresponding one of a plurality of distortion values;
calculate one or more perturbative coefficients $c_{m,n}^{px}$; and
transmit, via the output port, one or more information signals indicative of the one or more perturbative coefficient to the transmitter module, wherein the perturbative coefficients, $c_{m,n}^{px}$, satisfy:

$$c_{m,n}^{px} = \frac{1}{T} \sum_{t=0}^{T-1} \frac{\Delta u_{t,x}}{A_{n,p} A_{m+n,p}^* A_{m,x}}$$

where p is a polarization of the optical signals,
where m denotes a moving forward in time,
where n denotes a moving backward in time,
where T is a number of the series of electrical signals averaged, and
where t is $\Delta u_{t,x}$ at a particular point of time, and
where $\Delta u_{t,x}$ is one of the plurality of distortion values.

14. The coherent optical receiver module of claim 13, wherein transmitting, via the output port, one or more information signals indicative of the one or more perturbative coefficient to the transmitter module further comprises transmitting, via the output port, one or more information signals indicative of the one or more perturbative coefficient to the transmitter module for the transmitter module to modify the series of optical signals to preemptively mitigate the distortion.

15. The coherent optical receiver module of claim 13, wherein the one or more processor circuit configured to calculate one or more perturbative coefficient further comprises the one or more processor circuit configured to use least mean squares techniques applied to determinations of the distortion values over the time period.

16. The coherent optical receiver module of claim 13, wherein the one or more processor circuit comprises a digital signal processor, and wherein the one or more processor circuit configured to receive a series of electrical signals over a time period further comprises the one or more processor circuit configured to receive, with the digital signal processor, the series of electrical signals over the time period.

17. The coherent optical receiver module of claim 13, wherein the processor circuit comprises a Forward Error Correction Circuit, and wherein the data in the electrical signals is modified by the Forward Error Correction Circuit before calculation of the one or more perturbative coefficients.

* * * * *